(12) United States Patent
Poddar

(10) Patent No.: US 8,259,135 B2
(45) Date of Patent: Sep. 4, 2012

(54) ROTATED RENDERING AND LOCKING SUPPORT FOR TABLET COMPUTERS AND PORTRAIT DISPLAYS

(75) Inventor: Bimal Poddar, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 11/486,935

(22) Filed: Jul. 13, 2006

(65) Prior Publication Data

US 2008/0012869 A1    Jan. 17, 2008

(51) Int. Cl.
G09G 5/00 (2006.01)
(52) U.S. Cl. .......................... 345/649; 345/619; 345/650
(58) Field of Classification Search .................. None
See application file for complete search history.

(56) References Cited

U.S. PATENT DOCUMENTS

| | | | | |
|---|---|---|---|---|
| 4,931,960 A * | 6/1990 | Morikawa | ..................... | 358/1.11 |
| 4,995,089 A * | 2/1991 | Altrieth, III | ..................... | 382/297 |
| 5,640,627 A * | 6/1997 | Nakano et al. | ................. | 396/296 |
| 5,973,664 A * | 10/1999 | Badger | ........................ | 345/659 |
| 5,990,914 A * | 11/1999 | Horan et al. | ................... | 345/531 |
| 6,275,622 B1 * | 8/2001 | Krtolica | ......................... | 382/296 |
| 6,400,851 B1 | 6/2002 | Shih | | |
| 6,765,581 B2 * | 7/2004 | Cheng | .......................... | 345/568 |
| 6,781,587 B2 * | 8/2004 | Grigor | .......................... | 345/533 |
| 7,050,071 B2 | 5/2006 | Wyatt et al. | | |
| 7,075,548 B1 | 7/2006 | Poddar | | |
| 7,142,195 B2 * | 11/2006 | Northway et al. | ............ | 345/169 |
| 2004/0052431 A1 | 3/2004 | Locker et al. | | |
| 2005/0012752 A1 * | 1/2005 | Karlov | ........................ | 345/538 |

OTHER PUBLICATIONS

Hinckley, K., Pierce, J., Sinclair, M., Horvitz, E., Sensing techniques for mobile interaction, 2000, Proceedings of the 13th annual ACM symposium on User interface software and technology, pp. 91-100.*
Pending U.S. Appl. No. 11/150,553, filed Jun. 10, 2005; inventor: Poddar.
Chinese Patent Office, Chinese Office Action Report issued in corresponding CN Application No. 200780026261.9, dated Dec. 31, 2010, 7 pgs.
Korean Patent Office, PCT Search Report issued in corresponding PCT Application No. PCT/US2007/072849, dated Dec. 18, 2007, 2 pgs.

* cited by examiner

Primary Examiner — Said Broome
(74) Attorney, Agent, or Firm — Trop, Pruner & Hu, P.C.

(57) ABSTRACT

Apparatus, systems and methods for handling portrait mode oriented display surfaces without requiring expensive hardware in the display sub-system are disclosed. For example, an apparatus is disclosed such that the rendering of graphics data to the portrait mode display surfaces is redirected at rendering time such that there is no need for adding complicated hardware in the display part of the graphics adapter in order to handle conventional displays—all of which have no circuitry to deal with data natively stored in a portrait mode surface. Additionally, an apparatus to handle direct surface access of a surface through a surface lock which has already been rotated is already described. This can either be done by copying of surface data or by an optimized proposed apparatus which eliminates this copy. Other implementations are also disclosed.

17 Claims, 5 Drawing Sheets

ROTATED RENDERING AND LOCKING SUPPORT FOR TABLET COMPUTERS AND PORTRAIT DISPLAYS

BACKGROUND

Some flat panel and tablet computer displays can be physically rotated to display information in either landscape or portrait mode. Typical display drivers implement landscape mode by rendering data to a "landscape oriented" memory layout or "drawing surface" allocated in memory so that the pixels in each row of the drawing surface are stored on the same page or row in memory. This drawing surface permits display engines to fetch pixels from memory row-wise while incurring page misses only when switching between rows.

Because landscape mode is more traditional in displays, conventional display hardware expects to receive pixel data streamed to it in a sequence of rows of pixels conforming to the landscape oriented drawing surface even when the display is physically oriented in portrait mode. Thus, if a driver implements portrait mode by rendering to a "portrait oriented" drawing surface that places pixels in each row on the same page of memory, the display engine will incur a page miss with each pixel because the display hardware is still expecting the pixel data to be streamed from a landscape oriented drawing surface.

Common solutions to portrait mode rendering rely on either providing dual drawing surfaces in memory, one portrait oriented surface for the driver to render to and a rotated, landscape oriented surface accessed by the display engine, or by enhancing the display engine with line buffers. But creating dual drawing surfaces doubles the memory requirements of the display buffer and consumes memory bandwidth with the copy operation used to create the second, rotated surface. Alternatively, adding hardware line buffers to the display engine path incurs substantial hardware implementation costs.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings, which should not be taken to limit the invention to the specific implementations shown therein, are also not necessarily to scale nor should they be considered exhaustive, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
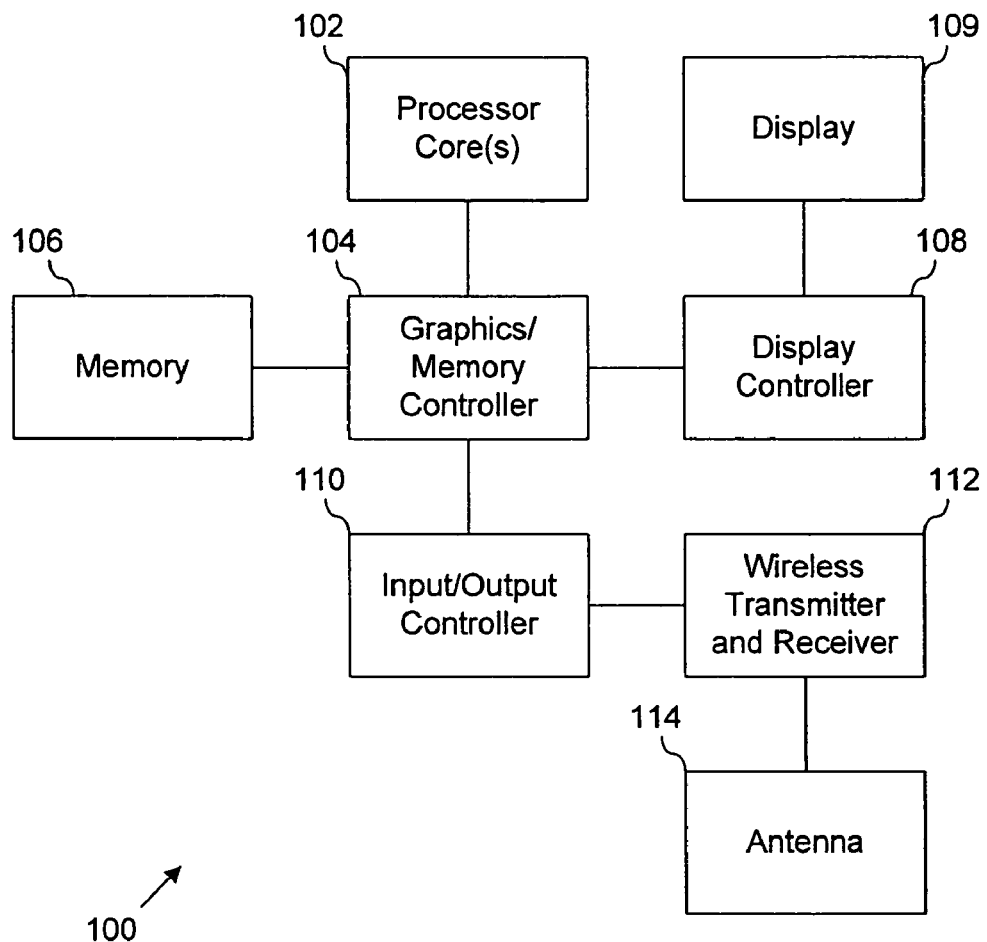
FIG. 1 is a block diagram illustrating a system in accordance with some implementations of the invention.

FIG. 1 illustrates an example system 100 according to some implementations of the invention. System 100 includes one or more processor core(s) 102 coupled to a graphics/memory controller 104 in addition to memory 106 (e.g., dynamic random access memory (DRAM), static random access memory (SRAM), non-volatile memory such as flash memory, etc.), a display controller 108 and display 109, and an input/output (I/O) controller 110 all coupled to controller 104. System 100 also includes wireless transmitter circuitry and wireless receiver circuitry 112 coupled to I/O controller 110 and an antenna 114 (e.g., dipole antenna, narrowband Meander Line Antenna (MLA), wideband MLA, inverted "F" antenna, planar inverted "F" antenna, Goubau antenna, Patch antenna, etc.) coupled to circuitry 112.

System 100 may be any system suitable for processing graphics data and providing that data in a format suitable for display. Moreover, system 100 may assume a variety of physical implementations. For example, system 100 may be implemented in a personal computer (PC), a networked PC, a server computing system, a handheld computing platform (e.g., a personal digital assistant (PDA)), a gaming system (portable or otherwise), a 3D capable cellular telephone handset, etc. Moreover, while all components of system 100 may be implemented within a single device, such as a system-on-a-chip (SOC) integrated circuit (IC), components of system 100 may also be distributed across multiple ICs or devices. For example, processor core(s) 102, controllers 104/110, memory 106, circuitry 112 and antenna 114 may be implemented, in part, as multiple ICs contained within a single computing platform, such as a personal computer (PC) or a set top box (STB) to name a few examples, while display controller 108 may be implemented in a separate device such as display 109 coupled to graphics/memory controller 104. Clearly, many such permutations are possible consistent with the functionality of system 100 as described herein.

Processor core(s) 102 may comprise special purpose or general purpose processor core (s) including any control and/or processing logic, hardware, software and/or firmware, capable of providing graphics/memory controller 104 with graphics data and/or instructions. Software drivers executing on system 100 may use processor core(s) 102 to perform a variety of graphics calculations or processes such as rendering image data, etc. the results of which may be provided to graphics/memory controller 104 and/or that may be stored in memory 106 for eventual use by display controller 108.

Processor core(s) 102 may further be capable of performing any of a number of tasks that support rotated rendering and locking support for tablet computers and portrait displays. These tasks may include, for example, although the invention is not limited in this regard, providing graphics or image data to controllers 104/108, downloading microcode to controllers 104/108, initializing and/or configuring registers within controllers 104/108, interrupt servicing, etc. While FIG. 1 may be interpreted as showing processor core(s) 102 and controllers 104/108 as distinct devices, the invention is not limited in this regard and those of skill in the art will recognize that processor core(s) 102 and one or both of controllers 104/108 and possibly additional components of system 100 may be implemented within a single IC.

Graphics/memory controller 104 may comprise any processing logic, hardware, software, and/or firmware, capable of processing or controlling the manipulation of graphics or image data and of controlling the storage of that data in memory 106. In one implementation, controller 104 may be implemented in a chipset IC, although the invention is not limited in this regard. Controller 104 may process graphics or image data provided by processor core(s) 102, held or stored in memory 106, and may provide that data to display controller 108.

Graphics processor 104 may also receive graphics or image data associated with one or more physical drawing surfaces in memory 106 and may enable the storing of that data in memory 106 in a format or layout suitable for accessing by display controller 108. In addition, controller 104 may, in accordance with some implementations of the invention, implement a scheme for placing graphics or image data in memory 106 by redirecting that data when it has been rendered to a portrait mode logical drawing surface in a manner as will be described in greater detail below.

Display controller 108 may comprise any processing logic, hardware, software, and/or firmware, capable of converting graphics or image data supplied by graphics/memory controller 104 into a format suitable for driving display 109 (i.e., display-specific data). For example, while the invention is not limited in this regard, controller 104 may retrieve graphics or image data from memory 106 and provide that data to controller 108 in a specific color format, for example in a compressed red-green-blue (RGB) pixel format, and controller 108 may process that RGB data by generating, for example, corresponding liquid crystal display (LCD) drive data levels, etc. Although FIG. 1 shows controllers 104 and 108 as distinct components, the invention is not limited in this regard, and those of skill in the art will recognize that, for example, some if not all of the functions of display controller 108 may be performed by controller 104 or vice versa. Display 109 may be any type of display that is capable of displaying information in either landscape mode or portrait mode. For example, display 109 may be an LCD, or an electroluminescent (EL) display, to name a few examples, that can be physically rotated to display graphics or image data in either landscape mode or portrait mode.

Figure 2:
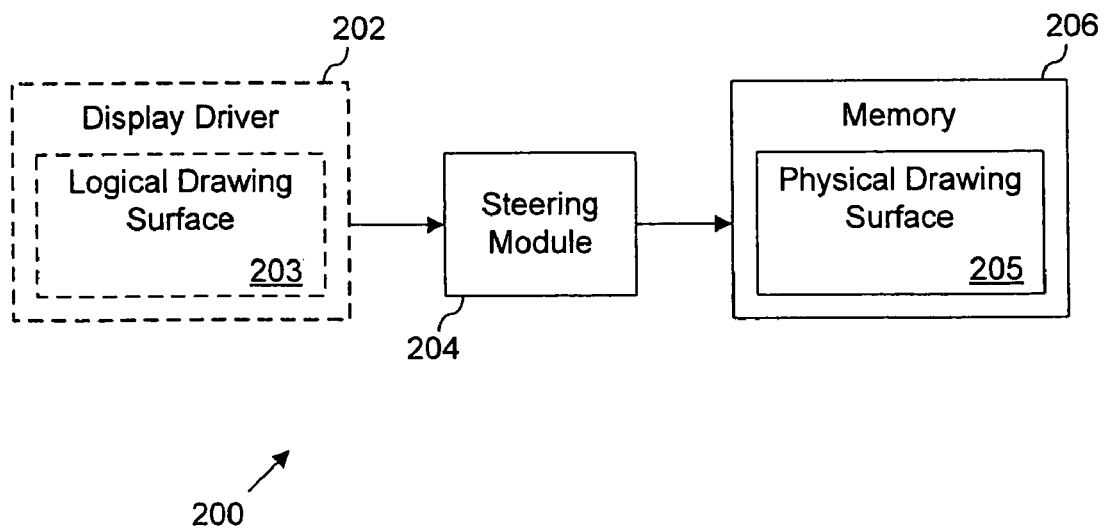
FIG. 2 is a block diagram illustrating a system in accordance with some implementations of the invention.

FIG. 2 illustrates a system 200 in accordance with some implementations of the invention. System 200 includes a display driver 202 to render image data to a logical drawing surface 203. Driver 202 may be referred to as logic to render pixel data. System 200 further includes a steering module 204 to steer or write the image data to a physical drawing surface 205 comprising storage locations in memory 206. Steering module 204 may be referred to as logic to map pixel data. In accordance with some implementations of the invention and as will be explained in greater detail below, when driver 202 writes image data to or reads image data from logical surface 203, where that data is organized in surface 203 in portrait mode, steering module 204 may map or direct or redirect or undertake low-level memory steering of that image data to physical surface 205 such that the data held in surface 205 is suitable for being accessed by a display engine that expects the image data held by surface 205 to be organized in landscape mode. In some implementations steering module 204 may include a chipset page table that undertakes the low-level memory steering although the invention is not limited in this regard.

As those skilled in the art will recognize, although the invention is not limited in this regard, driver 202 may comprise one or more software algorithms that may execute on one or more processor cores such as one or more of processor core(s) 102 of FIG. 1. In addition, although the invention is also not limited in this regard, logical surface 203 may be implemented in hardware registers associated with one or more of processor cores 102 or controller 104. Further, portions of system 200 may be similar to portions of system 100 of FIG. 1. For example, memory 206 could be memory 106. Moreover, those skilled in the art may recognize that physical surface 205 may comprise a display buffer including one or more contiguous blocks of memory locations or addresses of memory 206.

Figure 3:
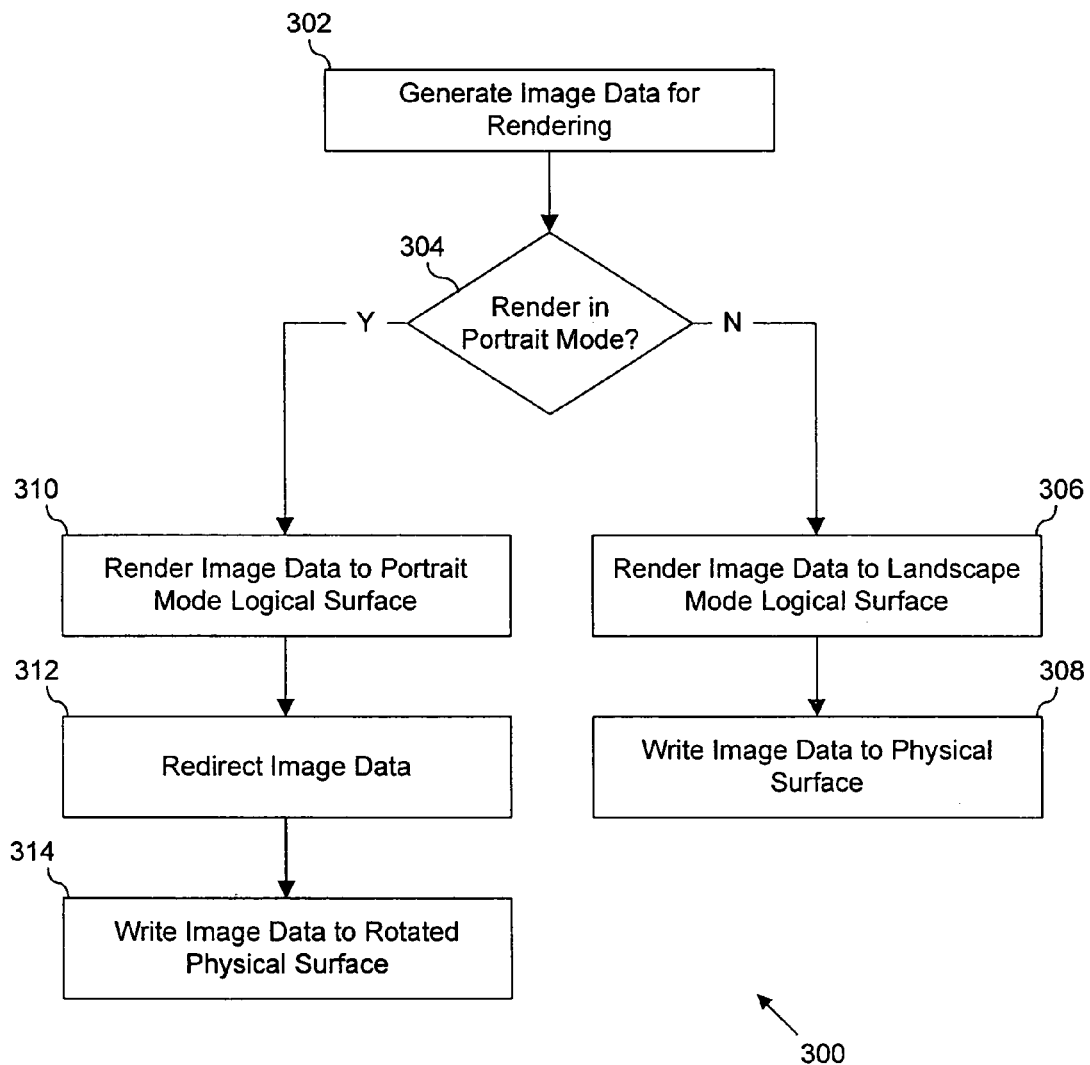
FIGS. 3-5 are flow charts illustrating processes in accordance with some implementations of the invention.
Figure 4:
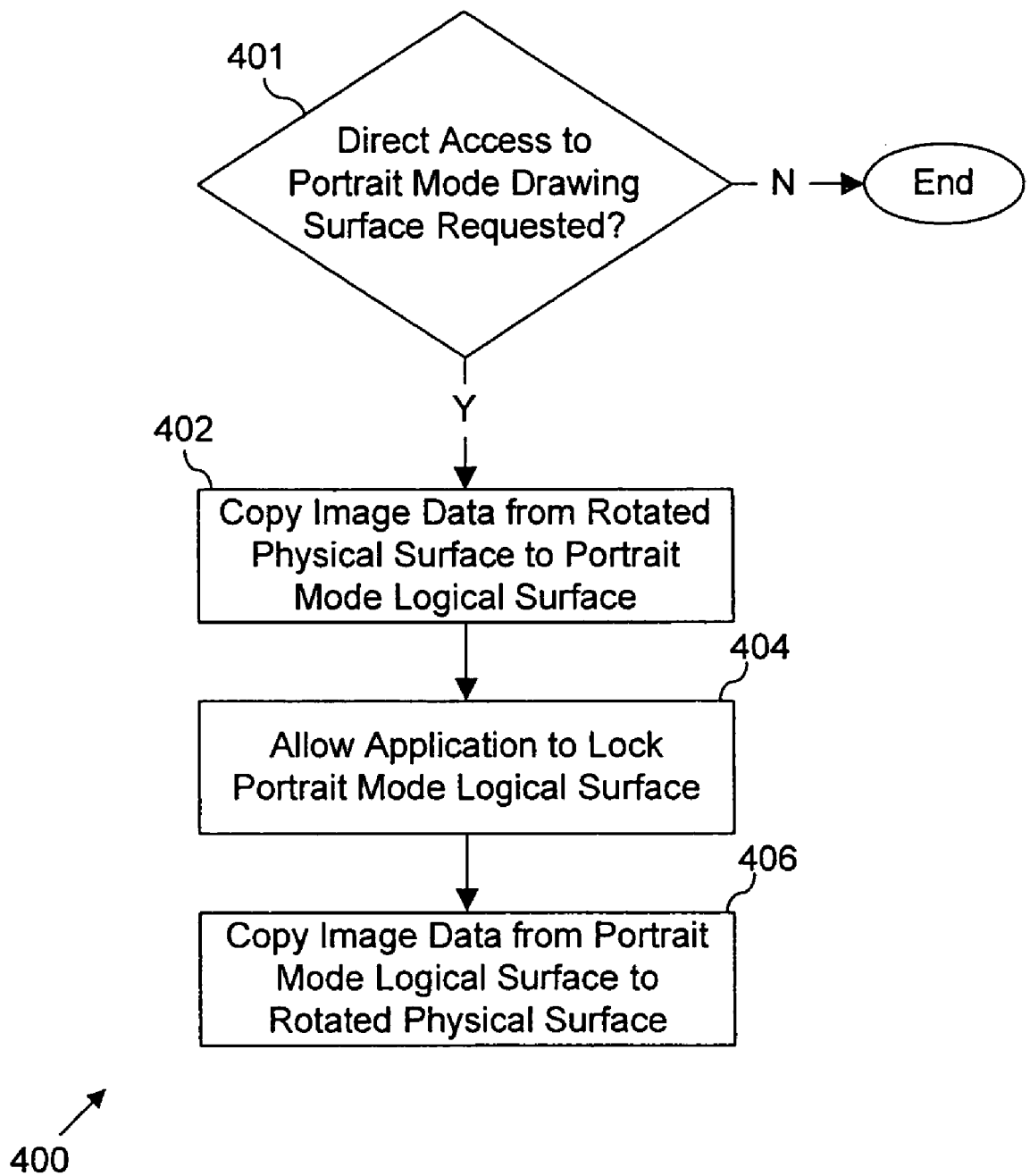
Figure 5:
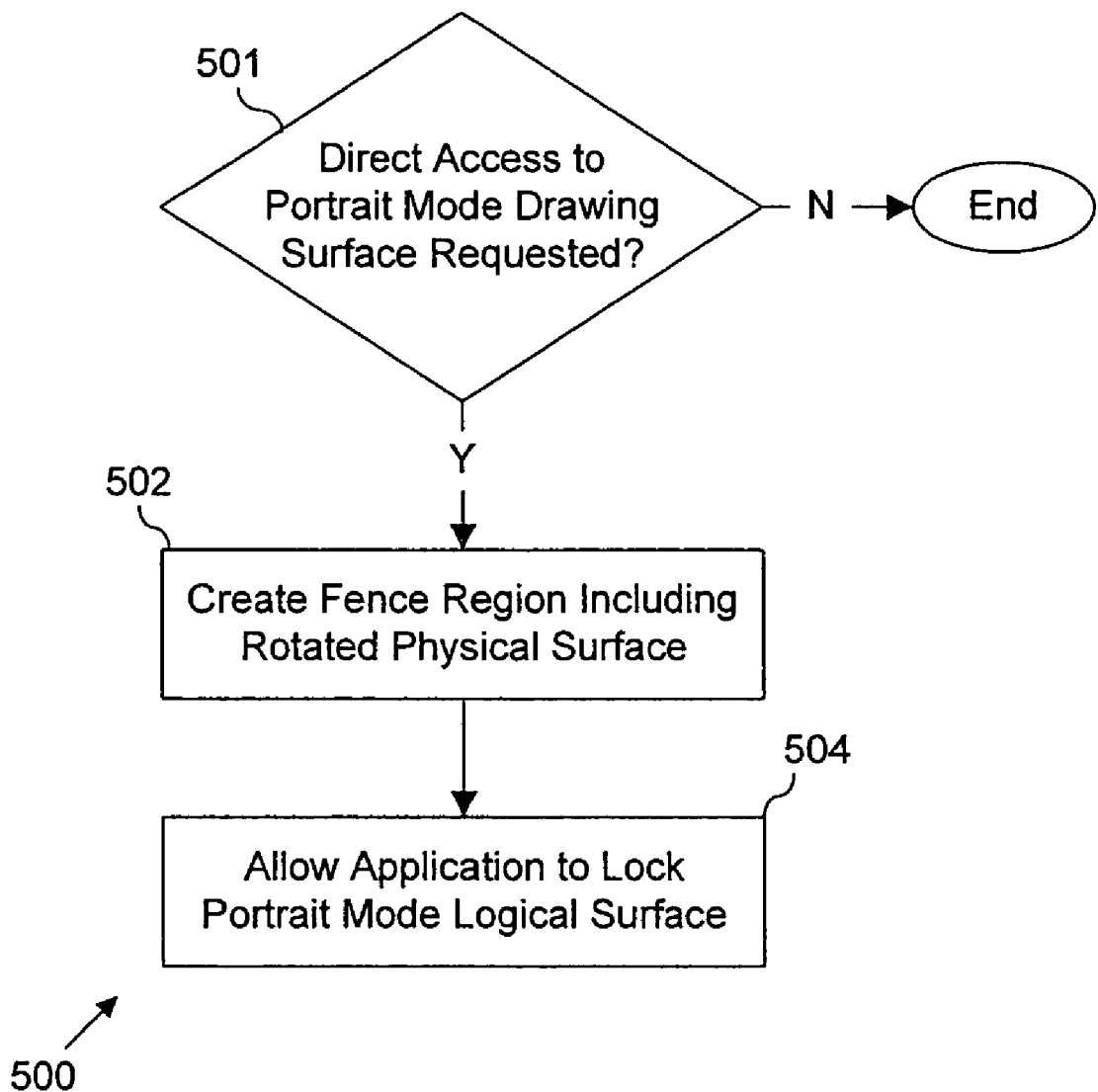

FIGS. 3-5 are flow charts illustrating respective processes 300-500 for implementing rotated rendering and locking support for tablet computers and portrait displays in accordance with some implementations of the invention. While, for ease of explanation, processes 300-500 may be described with regard to system 100 of FIG. 1 and/or system 200 of FIG. 2 the invention is not limited in this regard and other processes or schemes supported by appropriate devices in accordance with the claimed invention are possible.

Referring to FIG. 3, process 300 may begin with the generation of image data for rendering [act 302]. In some implementations, display driver 202 executing on systems 100/200 may generate image data in the form of pixel data comprising rows and columns of pixels. For example, although the invention is not limited in this regard, act 302 may comprise a software application associated with driver 202 undertaking a 3D graphics operation such as pixel shading to generate an image comprising pixels.

Process 300 may then continue with a determination of whether to render the image data in portrait mode [act 304]. One way to do this is to have the driver generating the image data in act 302 undertake the determination of act 304 based, for example, on an end-user specified display mode. If the result of act 304 is negative, that is, if the image data is to be rendered in landscape mode rather than portrait mode then process 300 may continue with the rendering of the image data to a landscape mode logical surface [act 306]. One way to undertake act 306 is to have driver 202 render pixel data (i.e., pixels) to logical surface 203 where that pixel data is organized in surface 203 in a landscape mode, orientation or aspect. The difference between a landscape mode logical surface and a portrait mode logical surface will be explained in greater detail below.

Process 300 may then continue with the writing of the image data to a physical surface [act 308]. In some implementations, act 308, may be undertaken by the same driver that undertook acts 302-306. As those skilled in the art will recognize, a driver, such as driver 202, may undertake act 308 by writing the image data's pixels in a block-wise fashion where driver 202 uses module 204 to steer or direct the pixel data to physical surface 205 in memory 206 where that pixel data is organized in surface 205 in a landscape mode, orientation or aspect. The invention is, however, not limited in this regard and the driver may undertake act 308 by writing the image data's pixels one pixel at a time to surface 205.

Figure 6:
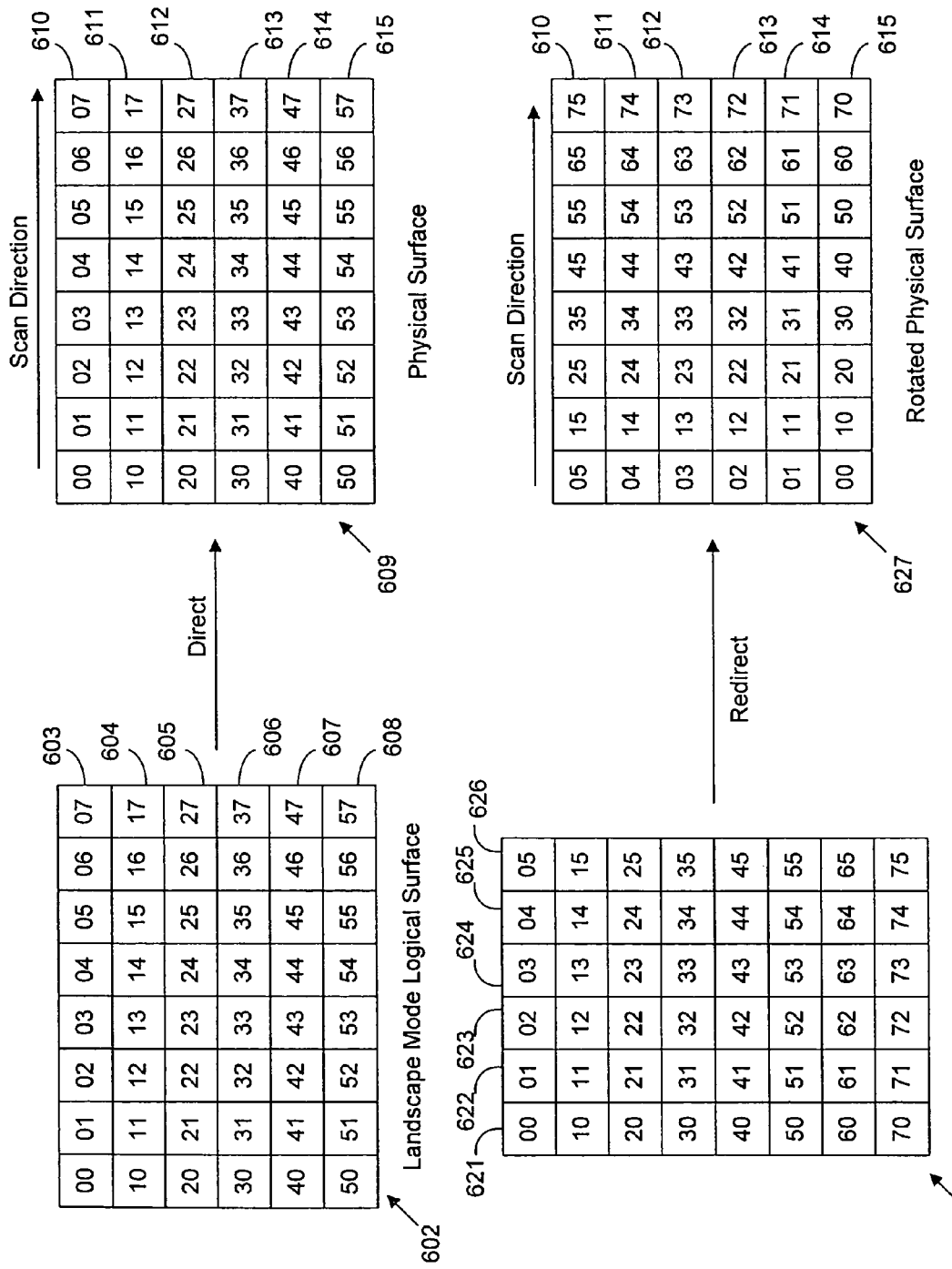
FIG. 6 is a block diagram illustrating representative drawing surface configurations in accordance with some implementations of the invention.

FIG. 6, provided for the purposes of explaining process 300 and/or related processes, illustrates a representative landscape mode logical surface 602 and a representative portrait mode logical surface 620. For example, logical surfaces 602 and 620 may represent different implementations of logical surface 203 of FIG. 2. In addition, FIG. 6 illustrates representative physical surfaces 609 and 627 where, in accordance with some implementations of the invention, physical surface 627 may be considered to be a rotated physical surface in comparison to physical surface 609 as will be explained in greater detail below. For example, physical surfaces 609 and 627 may represent different implementations of physical surface 205 of FIG. 2. While FIG. 6 is intended to aid discussion of processes 300-500 the specific elements and arrangements illustrated therein should not be construed to limit the claimed invention in anyway.

FIG. 6 shows logical surface 602 organized by, for example, driver 202, in a "8×6" or landscape mode comprising eight columns and six rows 603-608 of pixel values (00, 01, 02 etc.), and logical surface 620 organized in a "6×8" or portrait mode comprising six columns 621-626 and eight rows of pixel values as shown. Those skilled in the art will recognize, however, that the invention is not limited to a particular number of columns and rows of image data or pixels or pixel values and, thus, that the same techniques described herein with respect to process 300 and/or related processes may be applied to a general sized landscape or portrait mode where, for example, image data is organized in a 1024×768 landscape mode logical surface or a 768×1024 portrait mode logical surface. Further, those skilled in the art will recognize that the terms "image data", "pixel data", "pixel value" or "data value" as used herein may be used interchangeably without departing from the scope or spirit of the invention.

To aid description of some implementations of the invention a logical representation of a drawing surface may be distinguished from a physical representation of that surface. Thus, a logical image of a drawing surface (i.e., a logical surface such as either of surfaces 602 or 620) may be defined as the view of the surface as seen by an application or the driver for drawing or rendering on the surface. For example, landscape mode logical surface 602 may represent the logical image of the drawing surface where pixels 00, 01, 02 are sequentially laid out in memory where physical surface 609 may represent the physical view of the surface in memory. Since physical surface 609 is a landscape oriented surface, the logical view provided by surface 602 and the physical view provided by surface 609 are similar.

By contrast, however, while the logical view provided by logical surface 620 implies that pixels 00, 01, and 02 are all stored sequentially row-wise in memory and pixels 05, 15, and are stored non-sequentially in memory, the physical surface 627 resulting from the redirection of those pixels shows that, in actuality, pixels 00, 01, and 02 are stored non-sequentially in memory. Thus, while the logical view provided by surface 620 may be useful when a driver draws or renders onto that surface, after the image data has been processed to this logical surface, steering module 204 may reorganize or redirect the data such that pixels 05, 15, and 25 are all stored sequentially in memory while pixels 00, 01, and 02, organized sequentially in logical surface 620, are no longer stored sequentially in memory. In this sense, surface 627 may be described as a rotated physical surface in comparison to physical surface 609.

As shown in FIG. 6, physical drawing surfaces 609 and 627 comprise six rows of storage locations 610-615 where those rows may, for example, comprise memory pages of memory 106 or memory 206. In general, however, those skilled in the art will recognize that a page of memory may fully accommodate physical surfaces 609 and 627 but, in order to more clearly describe the invention, each row 610-615 of surfaces 609 and 627 may be considered to belong to a different page of memory. Further, those skilled in the art will recognize that data, such as pixel values, held or stored in one row of storage locations, such as one of rows 610-615, may be accessed or read such that a page miss is not incurred when accessing pixels in the same row, such as pixels 00-07 in row 610 of surface 609. By contrast, those skilled in the art will also recognize that switching between accessing or reading a first pixel or data value stored on one of rows 610-615 and accessing or reading a second pixel or data value stored on another row of rows 610-615 incurs a page miss thus increasing the time required to access or read that second pixel or data value.

Those skilled in the art will further recognize that data organized in logical surface 602 and rendered or written to physical surface 609 may be scanned out or streamed by hardware in controllers 104/108 or display 109 such that pixels 00-07 held in row 610 of surface 609 may be provided to display 109 without incurring a page miss when sequentially accessing or streaming the pixels in row 610. Similarly, the pixels held in each of rows 611-615 may likewise be sequentially accessed or streamed to display 109 such that page misses are not incurred in the process thereof. In accordance with some implementations of the invention, steering module 204 may act to redirect or steer the writing of the pixel data of logical surface 620 to physical surface 627 so that when that pixel data is sequentially accessed or streamed to display 109 from physical surface 627 the streaming hardware does not incur page misses for any of the pixel values organized or located adjacently in any one of columns 621-626 because those pixel values in any one of columns 621-626 are placed or held in a respective one of rows 610-615 of storage locations of surface 627.

Referring to both FIGS. 3 and 6, act 306 may involve driver 202 rendering pixel data to logical surface 602 and then act 308 may involve driver 202 writing the pixel data organized in logical surface 602 by using steering module 204 to steer or direct or map that image data to landscape oriented physical surface 609 implemented in memory such that pixels of each row 603-608 of logical surface 602 occupy the same one of rows 610-615 of physical surface 609 as shown in FIG. 6. In other words, driver 202, when rendering in, for example, four pixel blocks, may undertake act 308 by using steering module 204 to write pixels 00 and 01 of row 603 and pixels 10 and 11 of row 604 to surface 609 such that pixels 00 and 01 are held in row 610 and pixels 10 and 11 are held in row 611. Driver 202 may then continue to undertake act 308 by using steering module 204 to write pixels 02 and 03 of row 603 and pixels 12 and 13 of row 604 to surface 609 such that pixels 02 and 03 are held in row 610 adjacent to pixels 00 and 01 and pixels 12 and 13 are held in row 611 adjacent to pixels 10 and 11. By continuing in this manner, driver 202 and steering module 204 may undertake act 308 until all of the pixel data in logical surface 602 has been fully written or rendered to physical surface 609.

If the result of act 304 is positive, that is, if the data is to be rendered in portrait mode rather than landscape mode then process 300 may continue with the rendering of the image data to a portrait mode logical surface [act 310], followed by the redirection of the image data [act 312] and the writing of the image data to a rotated physical surface [act 314]. In accordance with some implementations of the invention, act 310 may be undertaken by driver 202 rendering image data to portrait mode logical surface 620, while acts 312 and 314 may be undertaken by having driver 202 use steering module 204 to write the image data or pixels of surface 620 to physical drawing surface 627 such that pixels of each column 621-626 of portrait mode logical drawing surface 620 occupy the same respective one of rows 610-615 of rotated physical surface 627 as shown in FIG. 6.

In other words, driver 202 may undertake acts 312 and 314 by using steering module 204 to write pixels 00 and 10 of column 621 and pixels 01 and 11 of column 622 to surface 627 such that pixels 00 and 10 are held in row 615 of surface 627 and pixels 01 and 11 are held in row 614 of surface 627. Driver 202 may then continue to undertake acts 312 and 314 by using steering module 204 to write pixels 02 and 12 of column 623 and pixels 03 and 13 of column 624 to surface 627 such that pixels 02 and 12 occupy row 613 of surface 627 and pixels 03 and 13 occupy row 612 of surface 627. By continuing in this manner, driver 202 and steering module 204 may undertake acts 312 and 314 until all the data in logical surface 620 has been fully written or rendered to rotated physical surface 627. Those skilled in the art will recognize that rendering requests to physical surface 627 need not be requests to write the full surface, but, rather, may be random requests to write to individual pixels and that each such rendered pixel in logical surface 620 may be steered or redirected to a location in physical surface 627 in acts 312 and 314.

FIG. 4 illustrates a scheme 400 for providing direct access to a drawing surface. Process 400 may begin with a determination of whether direct access to a portrait mode drawing surface has been requested [act 401]. Act 401 may arise when a software application or operating system (OS) executing on system 100/200 requests direct access (i.e., seeks to "lock") a logical representation of a drawing surface such as either of logical surfaces 602 or 620.

If an application or OS requests direct access to a landscape mode logical surface every read or write to a pixel of that logical surface can be directly steered or mapped to the corresponding pixel of the physical surface because the pixels of the corresponding physical surface match the layout of the pixels in the logical surface. For example, as FIG. 6 shows, the pixels of landscape mode logical surface 602 and physical surface 609 have a matching layout pattern. Thus, for example, an application or OS directly accessing a landscape mode logical surface such as surface 620 and using a pointer to a particular pixel, say, for example, pixel 21, will, when that application or OS increments the pointer to generate the address of the next logical pixel (pixel 22), be accessing pixel 22 because the next pixel row-wise adjacent to pixel 21 in the corresponding physical surface 609 is pixel 22.

By contrast, if an application or OS requests direct access to portrait mode logical surface every read or write to a pixel of the logical surface may need to be redirected to the corresponding pixel of the physical surface because the pixels of the corresponding physical surface have a rotated layout with respect to the layout of the pixels in the logical surface. For example, as FIG. 6 shows, the pixels of portrait mode logical surface 620 and physical surface 627 do not have a matching layout pattern. Thus, without benefit of some implementations of the present invention, an application directly accessing a portrait mode logical surface such as surface 620 and using a pointer to a particular pixel, such as pixel 21, will, when that application or OS increments the pointer to generate the address of the next logical pixel (pixel 22), actually be accessing a pixel other than pixel 22 because the next pixel row-wise adjacent to pixel 21 in rotated physical surface 627 is pixel 31 and not pixel 22.

If the result of act 401 is negative, that is, if an application or OS is not seeking direct access to a portrait mode logical surface, then process 400 may end. If, on the other hand, the result of act 401 is positive, that is, if an application or OS is seeking direct access to a portrait mode logical surface, then process 400 may continue with the copying of image data from the rotated physical surface to a portrait mode logical surface [act 402]. One way to do this is to have controller 104 use steering module 204 to copy the pixel data from rotated physical surface 627 to portrait mode logical surface 620. That is, referring to FIG. 6, the data corresponding to the first pixel (pixel 05) of row 610 of surface 627 may be copied to the first pixel position (i.e., the upper most pixel 05) of column 626 of surface 620 while the data corresponding to the second pixel (pixel 15) of row 610 of surface 627 may be copied to the second pixel position (i.e., the upper most pixel 15) of column 626 and so on until all the data of surface 627 is copied to surface 620. However, the invention is not limited to any particular method or scheme for the copying of image data from the rotated physical surface to portrait mode logical surface in act 402. In addition, the invention is not limited to locking an entire logical surface. Thus, for example, that the application could have requested a lock to only a partial rectangular region of the overall surface in act 401 in which case only the relevant partial surface data may copied in act 402.

Process 400 may then continue with allowing the application or OS to access or lock the portrait mode logical surface [act 404]. Thus, for example, once controller 104 has copied the pixel data from surface 627 to surface 620 in act 402, the application or OS that requested direct access in act 401 may be permitted to access and/or lock portrait mode logical surface 620 so that the application or OS may read and/or write pixel data to or from that logical surface.

Process 400 may then conclude with the copying of image data from the portrait mode logical surface to the rotated physical surface [act 406]. Thus, for example, once an application or OS has been allowed, in act 404, to access and/or lock portrait mode logical surface 620 so that the application or OS may read and/or write pixel data to or from that logical surface, controller 104 may copy the pixel data of surface 620 back to rotated physical surface 627 in act 406. That is, act 406 may involve copying of the data corresponding to the first pixel position (i.e., the upper most pixel 05) of column 626 of surface 620 to the first pixel (pixel 05) of row 610 of surface 627 followed by the copying of the data corresponding to the second pixel position (i.e., the upper most pixel 15) of column 626 to the second pixel (pixel 15) of row 610 of surface 627 and so on until all the data of surface 627 is copied to surface 620.

FIG. 5 illustrates another scheme 500 for providing direct access to a portrait mode drawing surface. Process 500 may begin with a determination of whether direct access to a portrait mode drawing surface has been requested [act 501]. Act 501 is similar to act 401 described above. If an application or OS has requested access to a portrait mode drawing surface then process 500 may continue with the creation of a fence region in memory [act 502]. This may be done in some implementations of the invention by, for example, having controller 104 create a fence region in memory, such as memory 106, where that fence region contains at least portions of physical drawing surface 627.

As those skilled in the art will recognize, a memory fence region defines special properties or rules for accessing a region of memory. In some implementations of the invention, establishing a fence region in act 502 may involve using logic to receive an access request and to remap or redirect that request so that the application or OS requesting direct access may still access the pixels it expects to access in accordance with the layout of the portrait mode logical surface even though the layout of the corresponding rotated physical surface does not match that logical surface's layout. For example, act 502 may involve using logic associated with steering module 204 of controller 104 to recognize that if an access request is made to any portion of portrait mode logical surface 620 (e.g., a pixel address/data pair targeting portrait mode logical surface 620) then that logic should alter or redirect or remap that access request so that it will correctly access the surface.

Process 500 may then conclude with allowing the application or OS to lock the portrait mode logical surface [act 504]. One way to implement act 504 is to use logic in steering module 204 to remap an access request specifying a pixel location in a portrait mode logical surface to the corresponding pixel data in the rotated physical surface. Thus, for example, if an application or OS issues a write request to pixel 05 in surface 620 (i.e., where the request specifies the logical address of pixel 05 in surface 620), controller 104 may use logic in steering module 204 to alter or redirect the address of that write request so that the application or OS accesses the correct pixel data. For example, if an application or OS increments a pointer from pixel 21 in logical surface 620 to pixel 22 in that surface and issues a write request targeting pixel 22 then, if steering module 204 does not alter or redirect the address for pixel 22 included in the write request, the write request will actually access pixel 31 of physical surface 627 rather than pixel 22 as intended. If, on the other hand, steering module 204 does, in accordance with acts 502 and 504, alter or redirect the address for pixel 22 included in the write request, the write request will access pixel 22 as intended.

The acts shown in FIGS. 3-5 need not be implemented in the order shown; nor do all of the acts necessarily need to be performed. Also, those acts that are not dependent on other acts may be performed in parallel with the other acts. For example, acts 302 and 304 may be undertaken in parallel. In other words, the act of generating image data for rendering [act 302] may include determining whether to render that data in portrait mode [act 304]. Alternatively, act 304 may be undertaken before act 302. In other words, the act of determining whether to render the image data in portrait mode [act 304] may take place before generating that data for rendering [act 302]. Further, at least some of the acts in this figure may be implemented as instructions, or groups of instructions, implemented in a machine-readable medium.

In accordance with some implementations of the invention a logical drawing surface may be generated in hardware registers without paying attention to the memory layout of the display-accessible physical drawing surface. Thus, the generation of the pixels of a logical drawing surface conforming to a portrait mode or "6×8" surface assumes that the physical drawing surface is also 6×8. Those skilled in the art of rendering with a 3D rendering pipeline will recognize that the generation of logical drawing surface pixels will honor Scissor rectangles, Polygon Stipple, clipping rectangle as if all operations were being done on a 6×8 surface. However, when these pixels are being written to memory or blended with pixels in the physical drawing surface in memory, the memory address for the pixels may be altered to accommodate the actual physical drawing surface organized in a landscape mode or "8×6" surface that is compatible with display rendering hardware. The computation of the new memory address may be undertaken using at most a couple of multipliers and adders. Because the computation of the new memory address happens at the tail end of all graphics operations it may not create any interaction issue with newer graphics features such as pixel or vertex shaders. Such shaders can freely work with (x, y) coordinates as if it was a 6×8 surface—only the memory sub-system of the graphics hardware is aware of the low-level memory steering.

In accordance with some implementations of the invention a lock operation can be supported by creating an un-rotated copy of the rotated physical surface and let an application or OS lock that "copy" surface. Alternatively, since the physical drawing surface belongs to the graphics engine and may be mapped in a chipset page table, all read/write operations to this surface may go through the chipset logic. Thus, lock operations may also be supported by defining a special "fence region" that associates a region of memory with special surface properties. Subsequently, when the chipset receives a memory read/write request for pixels the chipset can steer the reads/writes of these two pixels to two totally different addresses by using the fence region properties to compute the addresses to the pixels that the application was trying to access.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. For example, while FIG. 2 and the accompanying text may show and describe a system 200 including one steering module 204, those skilled in the art will recognize that systems in accordance with the invention may include more than one steering module functioning in parallel. Clearly, many other implementations may be employed to provide rotated rendering and locking support for tablet computers and portrait displays consistent with the claimed invention.

No device, element, act, data type, instruction etc. set forth in the description of the present driver should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
   storing an array of pixels in a first arrangement in a single memory;
   redirecting the addresses of said pixels to enable access to said pixels in a second arrangement from said single memory, while maintaining said pixels stored in said single memory in said first arrangement; and
   accessing, using said redirected addresses, said pixels in said second arrangement from said single memory.

2. The method of claim 1 wherein said first arrangement is a landscape mode and said second arrangement is a portrait mode.

3. The method of claim 1 wherein said single memory is a frame buffer.

4. The method of claim 1 including using a display driver and a steering module to change the addresses of said pixels.

5. The method of claim 1 including selectively displaying said pixels in either a landscape or a portrait mode.

6. The method of claim 5 including using only said single memory to display said pixels in said landscape or said portrait modes.

7. A non-transitory computer readable medium storing instructions executed by a computer to:
- store an array of pixels in a first arrangement in a single memory;
- redirect the addresses of said pixels to enable access to said pixels in a second arrangement from said single memory, while maintaining said pixels stored in said single memory in said first arrangement; and
- access, using said redirected addresses, said pixels in said second arrangement from said single memory.

8. The non-transitory computer readable medium of claim 7 further storing instructions such that said first arrangement is a landscape mode and said second arrangement is a portrait mode.

9. The non-transitory computer readable medium of claim 7 further storing instructions such that said single memory is a frame buffer.

10. The non-transitory computer readable medium of claim 7 further storing instructions to use a display driver and a steering module to change the address of said pixels.

11. The non-transitory computer readable medium of claim 7 further storing instructions to selectively display said pixels in either a landscape or a portrait mode.

12. The non-transitory computer readable medium of claim 11 further storing instructions to use only said single memory to display said pixels in said landscape or said portrait modes.

13. An apparatus comprising:
- a display driver;
- a steering module coupled to said display driver;
- a single memory coupled to said steering module; and
- an array of pixels being stored in a first arrangement in said single memory, said steering module to redirect the addresses of said pixels to enable access to said pixels in a second arrangement from said single memory, while maintaining said pixels stored in said single memory in said first arrangement.

14. The apparatus of claim 13 wherein said first arrangement is a landscape mode and said second arrangement is a portrait mode.

15. The apparatus of claim 13 wherein said single memory is a frame buffer.

16. The apparatus of claim 13 wherein said steering module to selectively display said pixels in either a landscape or a portrait mode.

17. The apparatus of claim 16 wherein said single memory is used to display pixels in said landscape and said portrait modes.

* * * * *